United States Patent
Zhou

(10) Patent No.: US 10,992,646 B2
(45) Date of Patent: Apr. 27, 2021

(54) DATA TRANSMISSION METHOD AND DATA TRANSMISSION APPARATUS

(71) Applicant: Xingchang Zhou, Jiangsu (CN)

(72) Inventor: Xingchang Zhou, Jiangsu (CN)

(*) Notice: Subject to any disclaimer, the term of this patent is extended or adjusted under 35 U.S.C. 154(b) by 130 days.

(21) Appl. No.: 16/003,103

(22) Filed: Jun. 7, 2018

(65) Prior Publication Data

US 2018/0302379 A1  Oct. 18, 2018

Related U.S. Application Data

(63) Continuation of application No. PCT/CN2017/071103, filed on Jan. 13, 2017.

(30) Foreign Application Priority Data

Jan. 15, 2016  (CN) .......................... 201610027191.X
Jun. 20, 2016  (CN) .......................... 201610444143.0

(51) Int. Cl.
*H04L 29/06*   (2006.01)
*G06F 21/60*   (2013.01)
*H04N 7/18*    (2006.01)

(52) U.S. Cl.
CPC ............ *H04L 63/04* (2013.01); *G06F 21/606* (2013.01); *H04L 63/083* (2013.01); *H04N 7/18* (2013.01)

(58) Field of Classification Search
CPC ...................................................... H04L 63/04
See application file for complete search history.

(56) References Cited

U.S. PATENT DOCUMENTS

| | | | | |
|---|---|---|---|---|
| 5,907,619 A | * | 5/1999 | Davis .................... | G06F 21/606 348/E7.056 |
| 2004/0249905 A1 | * | 12/2004 | Wilcock ................ | H04W 88/06 709/217 |
| 2007/0061583 A1 | * | 3/2007 | Kanatsu .................. | H04K 1/00 713/176 |
| 2012/0159606 A1 | * | 6/2012 | Sobolewski .......... | G06F 40/154 726/12 |
| 2015/0261962 A1 | * | 9/2015 | Mevec .................... | G06F 21/60 726/26 |
| 2018/0302379 A1 | * | 10/2018 | Zhou ....................... | H04L 63/04 |

FOREIGN PATENT DOCUMENTS

| | | |
|---|---|---|
| CN | 111819555 A | 10/2020 |
| CN | 111989665 A | 11/2020 |
| CN | 111989939 A | 11/2020 |

* cited by examiner

*Primary Examiner* — Ponnoreay Pich

(57) ABSTRACT

The present invention discloses a data transmission method and a data transmission apparatus. The method includes: sending, by a first computer, first data to a first image capture apparatus through an image output port of the first computer; receiving, by the first image capture apparatus, the first data; and sending, by the first image capture apparatus, the first data to a second computer; or processing, by the first image capture apparatus, the first data to generate second data, and sending, by the first image capture apparatus, the second data to a second computer; where the first image capture apparatus has an image input port, the image input port is connected to the image output port of the first computer, and the image output port of the first computer includes an output port of a display card of the first computer. The present invention can effectively reduce leakage of corporate data.

12 Claims, 8 Drawing Sheets

6002

"Create"

zhang

Hello

Hello

ZhangSan

The user is registered successfully

The user name already exists or passwords entered twice are inconsistent

"Login"

zhang

Hello

ZhangSan

The user name does not match the password

FIG.8

DATA TRANSMISSION METHOD AND DATA TRANSMISSION APPARATUS

FIELD OF THE INVENTION

The present invention relates to the field of Internet/computer technologies, and in particular, to a data transmission method and a data transmission apparatus.

BACKGROUND OF THE INVENTION

In current society, many companies and organizations have their own websites, used to publish information for customers and users to learn information about the companies and organizations. However, such websites may be subject to great security threats and easily attacked by hackers, providing opportunities for the hackers to access databases of corporate websites, and causing leakage of corporate data.

SUMMARY OF THE INVENTION

An objective of the present invention is to provide a data transmission method and a data transmission apparatus. Because a new transmission technology is used between a database server and a web server, existing virus and hacker attack means can hardly work.

A first aspect of the present invention provides a data transmission method, where the method is used to transmit data between a first computer and a second computer, and includes: sending, by the first computer, first data to a first image capture apparatus through an image/video output port of a display card of the first computer, and sending, by the first image capture apparatus, the first data to the second computer, or sending, by the first image capture apparatus after processing, to the second computer.

A second aspect of the present invention provides a data transmission apparatus, where the apparatus is used to transmit data between computers, and the apparatus includes a first computer, a first image capture apparatus, a second computer, and a second image capture apparatus, where an image/video output port of a display card of the first computer is connected to an input port of the first image capture apparatus, an image/video output port of a display card of the second computer is connected to an input port of the second image capture apparatus, the first computer is connected to the second image capture apparatus by using a network cable or a USB data cable, and the second computer is connected to the first image capture apparatus by using a network cable or a USB data cable.

The first computer is one of a web server and an application server, and the second computer is a database server.

A video capture apparatus is usually referred to as a video/image capture apparatus. The video capture apparatus may be referred to as an image capture apparatus when the video capture apparatus captures a single image.

In the present invention, all video output ports are also image output ports, and all video input ports are also image input ports.

The image capture apparatus has an image input port, and the image input port is connected to an output port of a display card.

The output port of the display card may be referred to as an image output port, and may also be referred to as a video output port.

BRIEF DESCRIPTION OF DRAWINGS

The following further describes the present invention in detail with reference to the accompanying drawings and specific embodiments.

FIG. 3 is a first sample of an image according to the present invention;

FIG. 4 is a second sample of an image according to the present invention;

FIG. 5 is a third sample of an image according to the present invention;

FIG. 6 is a fourth sample of an image according to the present invention;

FIG. 7 is a fifth sample of an image according to the present invention; and

FIG. 8 is a sixth sample of an image according to the present invention.

Figure 1:
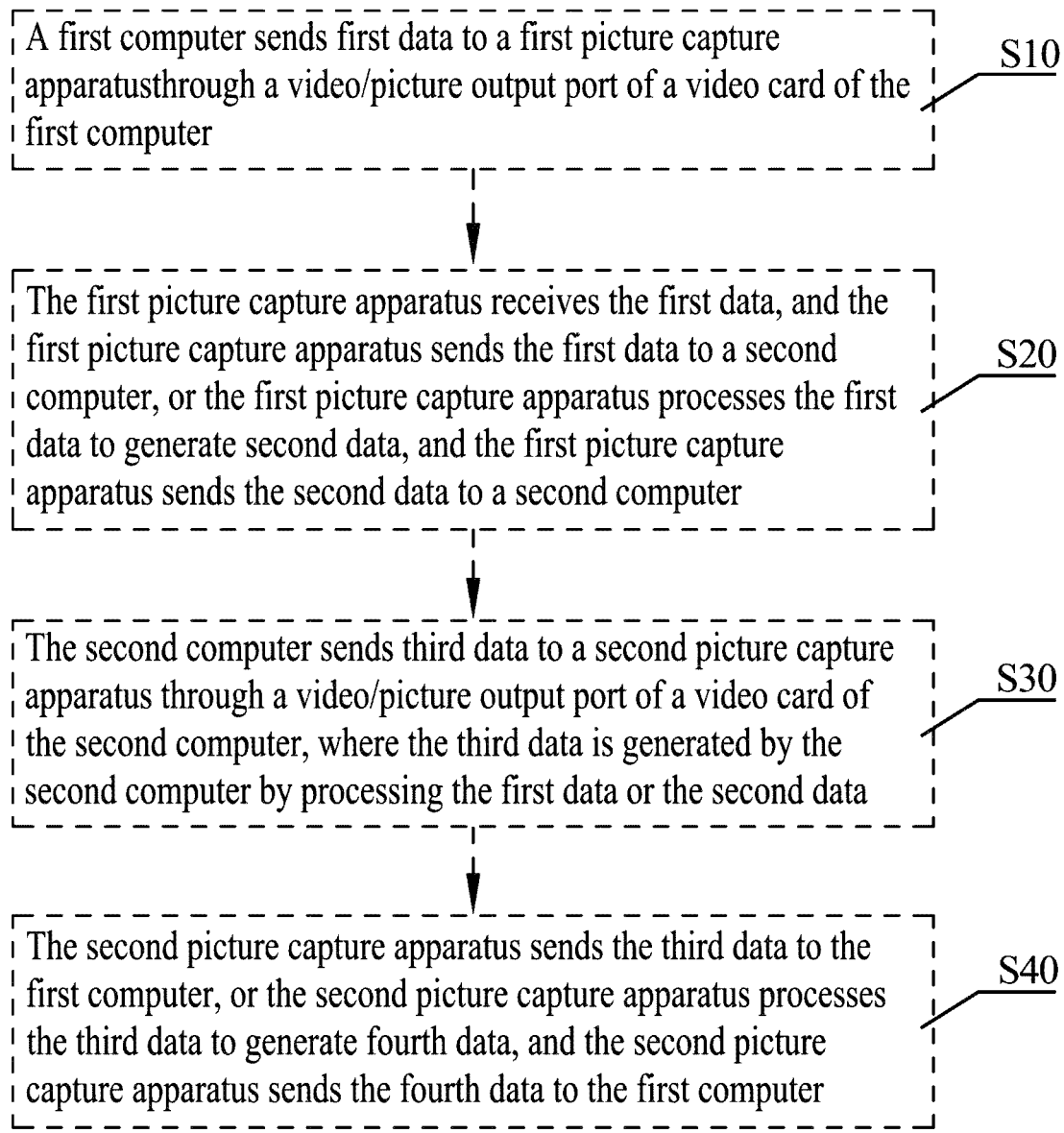
FIG. 1 is a flowchart of an embodiment of a method for data transmission between a first computer and a second computer according to the present invention.

LEGEND 1. first computer, 2. first image capture apparatus, 3. second image capture apparatus, 4. second computer, 5. first display card, 6. second display card, 7. third display card, 8. fourth display card, 9. first display, and 10. second display.

DETAILED DESCRIPTION OF THE INVENTION

To describe the technical solutions in the embodiments of the present invention or in the prior art more clearly, the following describes the specific embodiments of the present invention with reference to accompanying drawings. Apparently, the accompanying drawings in the following description merely show some embodiments of the present invention, and a person of ordinary skill in the art can derive other drawings and other embodiments from these accompanying drawings without creative efforts.

To make the figures simple, each figure merely exemplarily shows parts related to the present invention, and the parts do not represent parts of an actual structure of a product. In addition, to make the figures simple and easy to understand, for components having a same structure or function in some figures, only one is illustrated, or only one is marked. In this document, "one" not only indicates "only one", but also may indicate "more than one".

1. Create a Website:

Windows Server 2008 or an operating system later than Windows Server 2008 (such as Windows Server 2012 or Windows Server 2012 R2) is installed in a first computer 1.

A website W is created in the first computer 1, and user data of the website W is stored in a database B. The user data includes a user name, a password, and personal information of a user. The personal information includes the name, a telephone number, and the like. The database B is installed in a second computer 4. A step of storing the user data of the website W in the database B is described in detail in subsequent embodiments. A person skilled in the art often uses a development language or platform such as .NET or JAVA to generate a web page of the website W.

In subsequent embodiments, a program developer may select different development tools according to requirements.

The first computer is a web server (Web Server). The first computer may also be an application server (Application Server).

A definition of the application server may be any one of the following:

(1) The application server is a computer that runs at least one server application, where the server application and a client application on another computer or a client application on a mobile device can form a corresponding server/client relationship.

(2) The application server can receive web server data or instructions, and send, after further processing the data, the data to the database server or another computer.

The second computer is a database server (Database Server). A main purpose of the database server is to receive and store data sent by the first computer (the web server or the application server or another computer).

2. Set:

(1) A first display card 5 and a third display card 7 are display cards of a same type, and the first display card 5 and the third display card 7 use a same driver.

In an initial state, neither the first display card 5 nor the third display card 7 outputs a signal. Unless otherwise specified, the first display card does not output desktop content of the first computer.

The third display card does not output desktop content of the second computer.

(2) A dynamic link library Rec.dll is added in a system directory (generally, the system directory is C:\Windows\System32\) or a directory specified by a user on the first computer and the second computer separately, where the dynamic link library includes a Recpic( ) function. The function Recpic( ) is described in detail in examples of the embodiments.

(3) In the embodiments, the first computer includes software M, a program P (program P for short), software F, software K, and other programs. The second computer includes software J. Functions of the programs are described in detail in the embodiments. Common development languages (tools) or platforms used by developers to compile the programs are .NET, JAVA, and the like (program developers may select different development tools according to requirements).

(4) The first computer sends an image through a video/image output port of the first display card (or the second computer sends an image through a video/image output port of the third display card), where content recognized in the image includes a letter, a number, a text, and a symbol; a height of the content in the image is from 1.5 millimeters to 40 millimeters; a background color in the image is white; a color of the content in the image is black; and a line spacing of the content in the image is from 1 millimeter to 15 millimeters.

It should be noted that, after the data in the image sent by the computer through the video/image output port of the display card is recognized, a blank line needs to be deleted first, and the data recognized in the image in the examples of the embodiments does not include a blank line any longer.

(5) The first or third display card transmits 24 (or 60) images per second. A resolution of an image output by the first display card is consistent with a resolution of an image captured by a first image capture apparatus; and a resolution of an image output by the third display card is consistent with a resolution of an image captured by a second image capture apparatus.

(6) For data formats in the images, refer to the following tables:

TABLE 1

| | Length (Bytes) | Type | Example |
|---|---|---|---|
| Sequence number | 20 | Integer | 6002 |
| Command type | 30 | Character | "Create" |
| User name | 20 | Character | Zhang |
| Password entered for a first time | 20 | Character | Hello |
| Password entered for a second time | 20 | Character | Hello |
| Name | 20 | Character | ZhangSan |
| Telephone number | 11 | Character | 13888888888 |

The foregoing Table 1 shows a data format A in an image. For a display form of the image on a screen, refer to FIG. 3.

TABLE 2

| | Length (Bytes) | Type | Example |
|---|---|---|---|
| Sequence number | 20 | Integer | 6002 |
| Identifier of successful registration of the user | 1 | Character | Y |
| Result | 120 | Character | The user is registered successfully |

The foregoing Table 2 shows a data format B in an image. or a display form of the image on the screen, refer to FIG. 4.

TABLE 3

| | Length (Bytes) | Type | Example |
|---|---|---|---|
| Sequence number | 20 | Integer | 6002 |
| Identifier of failed registration of the user | 1 | Character | N |
| Result | 120 | Character | The user name already exists or passwords entered twice are inconsistent |

The foregoing Table 3 shows a data format C in an image. For a display form of the image on the screen, refer to FIG. 5.

TABLE 4

| | Length (Bytes) | Type | Example |
|---|---|---|---|
| Sequence number | 20 | Integer | 8002 |
| Command type | 30 | Character | Login "__" |
| User name | 20 | Character | Zhang |
| Password | 20 | Character | Hello |

Figure 6:
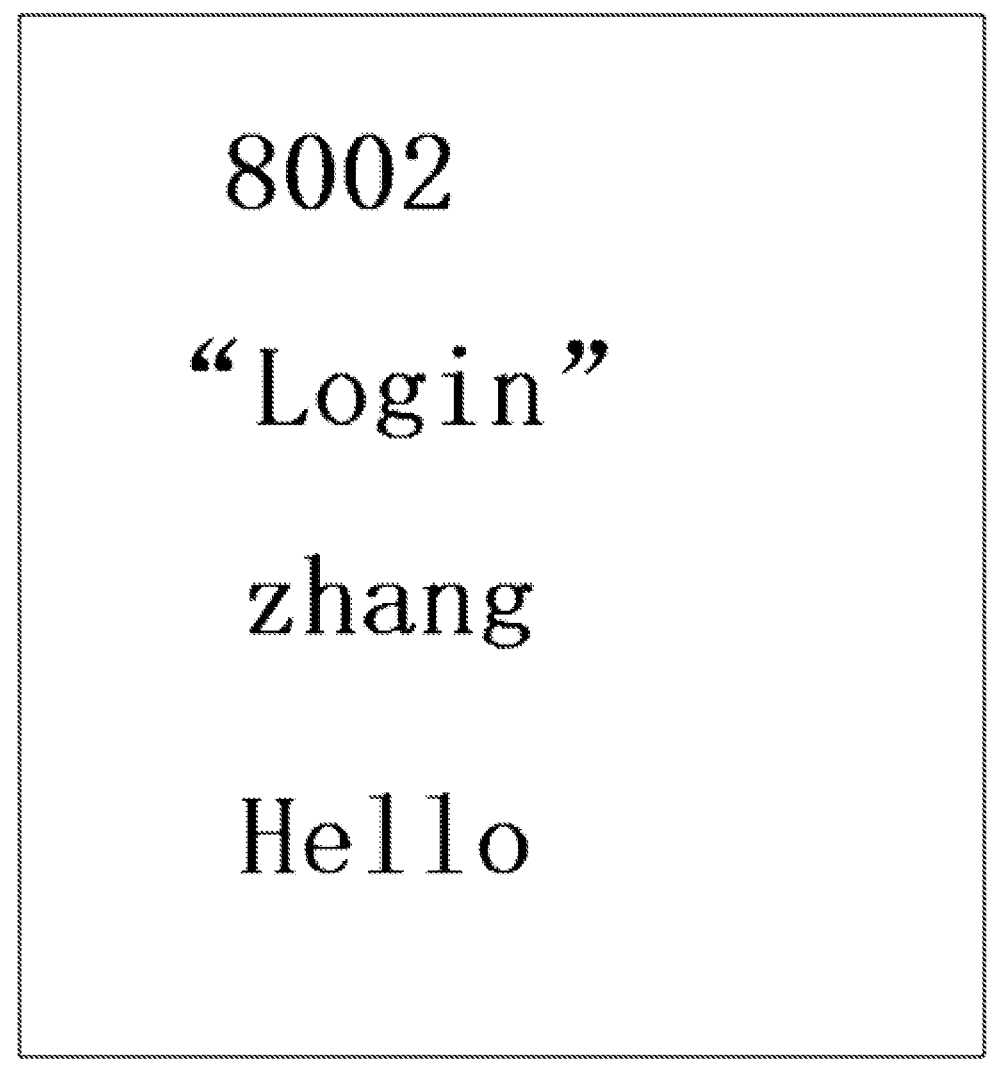

The foregoing Table 4 shows a data format D in an image. For a display form of the image on the screen, refer to FIG. 6.

TABLE 5

|  | Length (Bytes) | Type | Example |
|---|---|---|---|
| Sequence number | 20 | Integer | 8002 |
| Identifier of successful login of the user | 1 | Character | Y |
| Name | 20 | Character | ZhangSan |
| Telephone number | 11 | Character | 13888888888 |

Figure 7:
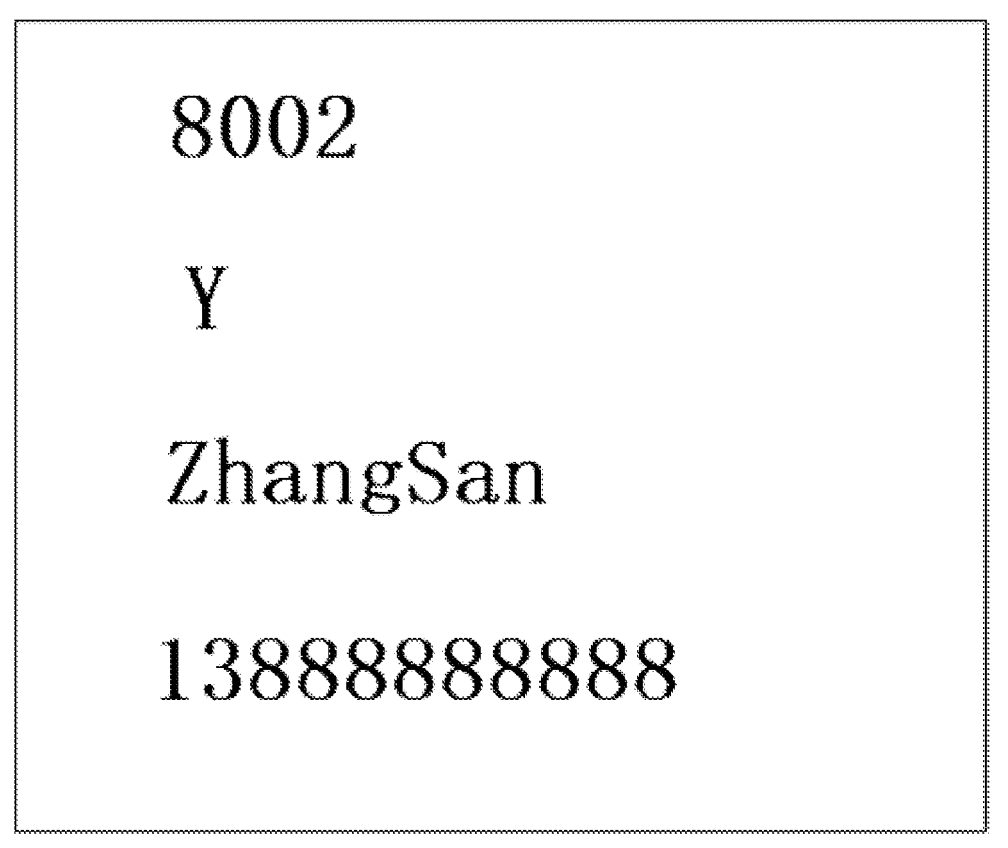

The foregoing Table 5 shows a data format E in an image. For a display form of the image on the screen, refer to FIG. 7.

TABLE 6

|  | Length (Bytes) | Type | Example |
|---|---|---|---|
| Sequence number | 20 | Integer | 8002 |
| Identifier of failed login of the user | 1 | Character | N |
| Result | 30 | Character | The user name does not match the password |

The foregoing Table 6 shows a data format F in an image. For a display form of the image on the screen, refer to FIG. 8.

One embodiment of the present invention:

1. A user F opens a user registration page of the website W, first enters a user name (zhang), then enters a password (Hello) for a first time, enters the password (Hello) for a second time, and then clicks a "Register" button after entering a name (ZhangSan) and a telephone number (13888888888).

2. The first computer runs the program P, and the program P generates a sequence number. Assuming that the sequence number generated this time is 6002, the sequence number increases sequentially. The program P puts 6002, "Create", the user name, the password entered for the first time, the password entered for the second time, the name, and the telephone number in an image Z. For a display form of the image Z on the screen, refer to FIG. 3 (for a data format in the image Z, refer to the foregoing Table 1). The program P saves the image Z as an image file 6002.jpg (RGB mode). The image file is named the sequence number, and 6002.JPG is stored in a D:\Temp\ directory of the first computer.

3. The first computer converts the image file 6002.jpg into a signal suitable for transmission by a VGA port of the first display card (the first display card is considered as a component of the first computer), and then sends the signal to the first image capture apparatus 2.

A used method is as follows (it should be noted that, another method may also be used, and the method is not limited to the following method):

(1) The program P invokes the function Recpic( ) in the dynamic link library Rec.dll; the program P transfers 6002.jpg to the function Recpic( ); and the function Recpic( ) runs a program to obtain data information of 6002.jpg (the data information includes an RGB value of a pixel, an image width, an image height, and a bit width occupied by a single pixel).

(2) The function Recpic( ) invokes the driver of the first display card, and sends the data information of the image file 6002.jpg to the driver of the first display card; and then the driver of the first display card sends the data information of the image file 6002.jpg to a frame memory of the first display card.

(3) After all the data information of the image file 6002.jpg is transferred to the frame memory, the first display card converts the received data into an image signal suitable for transmission by the VGA port, and then sends the image signal to the first image capture apparatus 2.

4. The program P scans a D:\recfile directory once every two seconds, and checks whether a text file named a sequence number exists in the directory. In the example of this embodiment, the text file named the sequence number is 6002.txt.

5. The first image capture apparatus receives the image from the video/image output port of the first display card of the first computer; and after the first computer sends the image file 6002.jpg, the first computer deletes the image file 6002.jpg.

6. The first image capture apparatus sends the received image to the second computer, and the second computer saves the image as 0001.jpg, or the first image capture apparatus saves the received image as 0001.JPG, stores 0001.JPG in a memory of the first image capture apparatus, and then sends 0001.JPG to the second computer. A rule for naming image files is: increasing sequentially from 0001.

7. The second computer stores 0001.JPG in a D\recpic\ directory of the second computer; after the second computer is started, the second computer runs the software J; the software J automatically detects whether a new file exists in the D\repic\ directory; and after the software J detects that a new file 0001.JPG exists in the D\recpic\ directory, the software J recognizes and obtains data in 0001.JPG.

8. If the software J determines that a second line of the data is "Create", the second computer performs the following operations:

The software J first uses a third line of the read data as a user name, and searches a user list in the database B for the user name. Then the software J reads and compares a fourth line and a fifth line of the data:

(1) If the user name does not exist in the user list, and data in the fourth line and data in the fifth line in the data read by the software J are consistent, the software J uses data in the third line in the data as the user name, data in the fourth line as the password, data in the sixth line as the name, and data in a seventh line as the telephone number, and stores the foregoing in a record in the database B. The software J puts data in the first line, the identifier of successful registration of the user, and "The user is registered successfully" in the data in an image R. For a display form of the image R on the screen, refer to FIG. 4 (for a data format in the image R, refer to the foregoing Table 2). The software J saves the image R as S6002.jpg, where a rule for naming the image file is "S"+data in the first line in the data, and S6002.JPG is stored in a D\sendpic\ directory of the second computer.

(2) If the user name exists in the user list, or data in the fourth line and data in the fifth line in the data read by the software J are inconsistent, "The user name already exists or passwords entered twice are inconsistent" is returned. The software J puts the data in the first line, the identifier of failed registration of the user, and "The user name already exists or passwords entered twice are inconsistent" in the data in an image R. For a display form of the image R on the screen, refer to FIG. 5 (for a data format in the image R, refer to the foregoing Table 3). The software J saves the image R as S6002.jpg, where a rule for naming the image file is "S"+data in the first line in the data, and S6002.JPG is stored in the D\sendpic\ directory of the second computer.

9. The second computer converts the image file S6002.jpg into an image signal suitable for transmission by a VGA port of the third display card (the third display card is considered as a component of the second computer), and then sends the image signal to the second image capture apparatus, where the image signal is sent only once.

A used method is as follows (it should be noted that, another method may also be used, and the method is not limited to the following method):

(1) The software J invokes the function Recpic( ) in the dynamic link library Rec.dll; the function Recpic( ) reads the image file S6002.jpg; and the function Recpic( ) runs a program to obtain data information of S6002.jpg (the data information includes an RGB value of a pixel, an image width, an image height, and a bit width occupied by a single pixel).

(2) The function Recpic( ) invokes the driver of the third display card, and the function Recpic( ) sends the received data information of S6002.jpg to the driver of the third display card; and then the driver of the third display card sends the data information of S6002.jpg to a frame memory of the third display card.

(3) After all the data information of the image file S6002.jpg is transferred to the frame memory, the third display card converts the received data into an image signal suitable for transmission by the VGA port, and then sends the image signal to the second image capture apparatus 3.

It should be noted that, the step of converting the image or the image file into an image signal suitable for transmission by the VGA port of the display card is not described in detail in other embodiments.

10. The second image capture apparatus 3 receives the image from an image/video output port of the third display card in the second computer, then saves the image as R0001.JPG, and stores R0001.JPG in a memory of the second image capture apparatus. The second image capture apparatus sends the R0001.JPG image to the first computer, or the second image capture apparatus sends the received image to the first computer, and the first computer saves the received image as R001.jpg, where a rule for naming the image file is "R"+file number, and the file number increases sequentially from 0001.

11. The first computer stores R0001.JPG in a D:\recpic\ directory of the first computer; after the first computer is started, the first computer runs the software M; the software M automatically detects whether a new file exists in the D\recpic\ directory; after the software M detects that a new file R0001.JPG exists in the D\recpic\ directory, the software M recognizes and obtains data in R0001.JPG; if data in the first line is 6002, the software M saves the data as 6002.txt, and stores 6002.txt in the D:\recfile directory; and the software M deletes R0001.JPG from the first computer.

The program P finds 6002.txt in the D:\recfile directory, and the first computer further performs the following operations:

(1) If a letter in the second line in the 6002.txt file is "Y", the first computer sends "The user is registered successfully" to a computer of the user F, and a display of the computer of the user F displays "The user is registered successfully".

(2) If the letter in the second line in the 6002.txt file is "N", the first computer sends "The user name already exists or passwords entered twice are inconsistent" to the computer of the user F, and the display of the computer of the user F displays "The user name already exists or passwords entered twice are inconsistent".

(3) The program P deletes 6002.txt from the first computer.

Another embodiment of the present invention:

The following is set: The first computer runs a server (server) application; service data used by the server application is stored in the database B; the server application can receive a login request of an application U in a mobile phone of the user; and the server application and the program U in the mobile phone of the user can exchange data.

1. A user F opens a user login web page of the website W, enters a user name (zhang) and a password (Hello), and clicks a "Login" button, or a user F opens the application U in the mobile phone, enters a user name (zhang) and a password (Hello), and clicks a "Login" button.

2. The first computer runs the program P, where the program P is a part of an application of the website W, or may be a part of the server application. The program P generates a sequence number. Assuming that the sequence number generated this time is 8002, the sequence number increases sequentially. The program P puts 8002, "login", the user name, and the password in an image T. For a display form of the image T on the screen, refer to FIG. 6 (for a data format in the image T, refer to the foregoing Table 4). The image T is stored as 8002.jpg, and 8002.jpg is stored in a D:\pic directory of the first computer.

3. The first computer converts the image file 8002.jpg into a signal suitable for transmission by a VGA port of the first display card (the first display card is considered as a component of the first computer), and then sends the signal to the first image capture apparatus. The signal is sent only once. The program P deletes the image file 8002.jpg.

4. The program P scans a D:\recfile directory once every second, and checks whether a text file named the sequence number exists in the directory. In the example of this embodiment, the text file named the sequence number is 8002.txt.

5. The first image capture apparatus receives the image T from the video/image output port of the first display card of the first computer; the first image capture apparatus saves the image T as 0001.JPG, stores 0001.JPG in the memory of the first image capture apparatus, and then sends 0001.JPG to the second computer, or the first image capture apparatus sends the image T to the second computer, and the second computer saves the image T as 0001.jpg. In this step, a rule for naming image files is: increasing sequentially from 0001.

6. The second computer stores 0001.jpg in a D:\pic directory of the second computer; after the second computer is started, the second computer runs the software J; the software J automatically detects whether a new file exists in a D\recpic\ directory; and after the software J detects that a new file 0001.JPG exists in the D\recpic\ directory, the software J recognizes and obtains data in 0001.JPG.

7. If the software J determines that data in a second line is "login", the second computer performs the following operations: using a third line in the data read by the software J as the user name and using a fourth line as the password. The software J reads the user name and the password that are recorded and checked in the database B.

(A) If the user name matches the password, personal information of the user is returned, where the personal information is the name and the telephone number. The software J puts data in a first line, the identifier of successful login of the user, and the personal information of the user in the data in an image Y. For a display form of the image Y on the screen, refer to FIG. 3 (for a data format in the image Y, refer to the foregoing Table 5).

(B) If the user name does not match the password, "The user name does not match the password" is returned. The software J puts the data in the first line, the identifier of failed login of the user, and "The user name does not match the password" in an image Y. For a display form of the image Y on the screen, refer to FIG. 8 (for a data format in the image Y, refer to the foregoing Table 6).

8. The second computer converts the image Y into an image signal suitable for transmission by a VGA port of the third display card (the third display card is considered as a component of the second computer), and then sends the image signal to the second image capture apparatus, where the image signal is sent only once.

9. After the second image capture apparatus receives the image Y from an image/video output port of the third display card in the second computer, the second image capture apparatus saves the image Y as R0001.JPG, and then the second image capture apparatus sends R0001.JPG to the first computer, or the second image capture apparatus sends the image Y to the first computer, and the first computer saves the image Y as R0001.JPG. In this step, a rule for naming the image file is "R"+file number, where the file number increases sequentially from 0001.

10. The first computer stores R0001.JPG in a D:\recpic\ directory of the first computer; after the first computer is started, the first computer runs the software M; the software M automatically detects whether a new file R000.JPG exists in the D\recpic\ directory; after the software M detects that a new file R0001.JPG exists in the D\recpic\ directory, the software M recognizes and obtains data in R0001.JPG, where the data includes the personal information of the user or "The user name does not match the password"; if a number in the first line in the data is 8002, the software M saves the data as 8002.txt, and stores 8002.txt in the D:\recfile directory; and the software M deletes R0001.JPG from the first computer.

The program P finds 8002.txt in the D:\recfile directory, and the first computer further performs the following operations:

If the number in the first line in the data is 8002, the first computer further performs the following operations:

(1) If a letter in the second line in 8002.txt is "Y", the first computer sends the personal information of the user to a computer or a mobile phone of the user F, and a display of the computer or an application of the mobile phone of the user F displays "The user logs in successfully".

(2) If a letter in the second line in 8002.txt is "N", the first computer sends "The user name already exists or passwords entered twice are inconsistent" to the computer or the mobile phone of the user F, and the display of the computer or the application of the mobile phone of the user F displays "The user name does not match the password".

(3) The program P deletes 8002.txt from the first computer.

In another embodiment of the present invention, a requirement is further imposed on hardware:

The first image capture apparatus is an image capture card, and is installed in the second computer. The second image capture apparatus is an image capture card, and is installed in the first computer.

1. A user F opens a user login page of the website W, enters a user name and a password, and clicks a "Login" button.

2. The first computer runs the program P, and generates a sequence number, where a range of the sequence number is 5000 to 65535. If the generated sequence number is greater than 65535, the sequence number is reset to 5000, and the sequence number increases sequentially. Assuming that the sequence number generated this time is 8002, the program P puts 8002, "login", the user name, and the password in an image X. For a display form of the image X on the screen, refer to FIG. 6 (for a data format in the image X, refer to the foregoing Table 4).

3. The first computer converts the image X into a signal suitable for transmission by a VGA port of the first display card (the first display card is considered as a component of the first computer), and then sends the signal to the first image capture apparatus, where the signal is sent only once.

4. The program P runs a socket server program, where the socket receiver (server) program is used to receive data, and a socket communications port number used by the socket receiver program is 8002.

5. The first image capture apparatus captures (receives) the image X from the video/image output port of the first display card of the first computer.

A driver of the first image capture apparatus invokes the function Recpic( ) in the dynamic link library Rec.dll in the second computer, and the driver of the first image capture apparatus transmits the image X to the function Recpic( ).

6. The Recpic( ) function in Rec.dll in the second computer runs an image recognition program to recognize data in the image X, and the second computer performs the following operations:

If the function Recpic( ) in Rec.dll in the second computer determines that data in a second line is "login", a third line in the data read by the function Recpic( ) in Rec.dll in the second computer is used as the user name, and a fourth line is used as the password. The function Recpic( ) in Rec.dll in the second computer reads the user name and the password that are recorded and checked in the database B.

(A) If the user name matches the password, personal information of the user is returned, where the personal information is the name and the telephone number. The function Recpic( ) in the Rec.dll in the second computer puts the sequence number, the identifier of successful login of the user, and the personal information of the user in an image S. For a display form of the image S on the screen, refer to FIG. 7 (for a data format in the image S, refer to the foregoing Table 5).

(B) If the user name does not match the password, "The user name does not match the password" is returned. The function Recpic( ) in the Rec.dll in the second computer puts the sequence number, the identifier of failed login of the user, and "The user name does not match the password" in an image S. For a display form of the image S on the screen, refer to FIG. 8 (for a data format in the image S, refer to the foregoing Table 6).

7. The second computer converts the image S into a signal suitable for transmission by a VGA port of the third display card (the third display card is considered as a component of the second computer), and then sends the signal to the second image capture apparatus, where the signal is sent only once.

8. The second image capture apparatus captures (receives) the image S from the video/image output port of the third display card of the second computer, and a driver of the second image capture apparatus invokes the function Recpic( ) in the Rec.dll in the first computer. The function Recpic( ) in the Rec.dll in the first computer runs an image recognition program, and recognizes and obtains data in the image S.

If a number in a first line in the data is 8002, the function Recpic( ) in the Rec.dll in the first computer runs a socket transmitter program (client program), and the socket transmitter program sends out data that is recognized in the image, where a socket communications port number used by the socket transmitter program is 8002.

The software P in the first computer receives 12. The software P in the first computer receives the data, and the first computer further performs the following operations:

(1) If the data includes a letter "Y", "The user logs in successfully", and the personal information of the user, the first computer sends the personal information of the user to a computer of the user F, and a display of the computer of the user F displays "The user logs in successfully".

(2) If the data includes a letter "N" and "The user name does not match the password", the first computer sends "The user name already exists or passwords entered twice are inconsistent" to the computer of the user F, and the display of the computer of the user F displays "The user name does not match the password".

Another embodiment of the present invention:

1. The first computer runs the software K, and the software K opens a file 1.txt in the first computer. Assuming that content in the file 1.txt is less than 10 lines, or content in the file 1.txt is less than 400 Chinese characters, the software K puts the file name "1.txt" and the content of the file 1.txt in an image X, where the file name "1.txt" is put in a first line in the image X, and the image X may be a two-dimensional code image. The software K puts the image X in an image queue or a task list.

2. The first computer converts the image X into a signal suitable for transmission by a VGA port of the first display card, where the signal suitable for transmission by the VGA port is referred to as a signal Y, and the signal Y is sent out through the VGA port of the first display card.

3. The first image capture apparatus receives the signal Y from the video/image output port of the first display card of the first computer, and the first image capture apparatus converts the signal into 0001.jpg and sends 0001.jpg to the second computer.

4. The second computer receives 0001.JPG, and stores 0001.JPG in a D\recpic\ directory of the second computer, and then the second computer runs the software J, and the software J recognizes (recognizes and decodes) and obtains data in 0001.JPG.

5. The first line in the data is "1.txt", and data except the first line in the data is stored as 1.txt, or data except the first line in the data is stored as 1.doc.

Another embodiment of the present invention:

1. A camera is installed on the second computer, and the camera aims at a screen of the first computer. The second computer and the first computer are located in a same local area network.

2. The second computer is connected to the first computer by using an RS232 serial cable.

3. The first computer opens a file 1.txt. Assuming that content in 1.txt is less than 10 lines, the first computer displays the content in 1.txt on a whole screen of the first computer.

4. The first computer sends a signal to the second computer through the RS232 serial cable.

5. After receiving the signal sent by the first computer, the second computer takes an image, and saves the image as 2.jpg.

6. The second computer runs image recognition software, and the image recognition software first recognizes content X in 2.jpg, then obtains the file name 1.txt from a first line of the content X, finally deletes texts in the first and second lines in the content X, and then saves remaining content as 1.txt or 1.doc.

The following should be noted in any one of the foregoing embodiments:

An output port of a display card may be an image output port such as a DVI or an HDMI, and an input port of a corresponding image capture apparatus is also a corresponding image input port. The first computer converts a related image or image file into a signal suitable for transmission by the output port of the first display card such as the DVI or the HDMI, and transmits the signal. The second computer converts a related image or image file into a signal suitable for transmission by the output port of the third adapter card such as the DVI or the HDMI, and transmits the signal.

Any device that can obtain data from the first computer and can send an image signal to an image capture apparatus may be considered as a replacement of the display card. The user may use the technology illustrated in the foregoing embodiment to perform a plurality of operations, for example, changing the user password.

In addition, work (or a part of work) originally done by the first computer may be completed by two computers (the first computer and a third computer). The website is created in the third computer. The third computer is a web server. The third computer sends information required for accessing the database to the first computer. The first computer puts the information required for accessing the database in an image A. The first computer sends the image A to the database server (the second computer) by using the first image capture apparatus (other steps are omitted and are not further described in detail). In this case, the first computer may also be referred to as an application server.

In another embodiment of the present invention, as shown in FIG. 1, a data transmission method is used to transmit data between a first computer and a second computer, and includes the following steps.

Step S10: A first computer sends first data to a first image capture apparatus through a video/image output port of a display card of the first computer.

The first image capture apparatus has an image input port, and the image input port is connected to an image output port of the first computer. The image output port of the first computer includes the output port of the display card of the first computer.

The video/image output port of the display card of the first computer is the image output port of the first computer.

Step S20: The first image capture apparatus receives the first data, and the first image capture apparatus sends the first data to a second computer, or the first image capture apparatus processes the first data to generate second data, and the first image capture apparatus sends the second data to a second computer.

Step S30: The second computer sends third data to a second image capture apparatus through a video/image output port of a display card of the second computer, where the third data is generated by the second computer by processing the first data or the second data.

The video output port of the display card of the second computer is an image output port of the second computer.

The second image capture apparatus has an image input port, and the image input port is connected to the image output port of the second computer.

The image output port of the second computer includes the output port of the display card of the second computer.

Step S40: The second image capture apparatus sends the third data to the first computer, or the second image capture apparatus processes the third data to generate fourth data, and the second image capture apparatus sends the fourth data to the first computer.

Preferably, the first image capture apparatus has an image input port, and the image input port is connected to the image output port of the first computer; and the image output port of the first computer includes the output port of the display card of the first computer.

Preferably, the third data is generated by the second computer by processing the first data or the second data.

Preferably, before the first data is sent, the method further includes: after the first computer receives a request sent by a browser or an application for accessing or modifying a database, the first computer puts information required for implementing the request in the first data; or the first computer puts content of a file in the first computer in the first data; or the first computer processes content of a file in the first computer and then puts the content in the first data; or the first computer puts content of a web page in the first data; or the first computer puts content externally obtained by the computer in the first data; or the first computer puts information in the first computer in the first data.

Preferably, the first computer puts a file in the first computer in the first data; and after the second computer receives the first data, the second computer restores the first data to the file or the second computer stores the first data in a new file.

Figure 2:
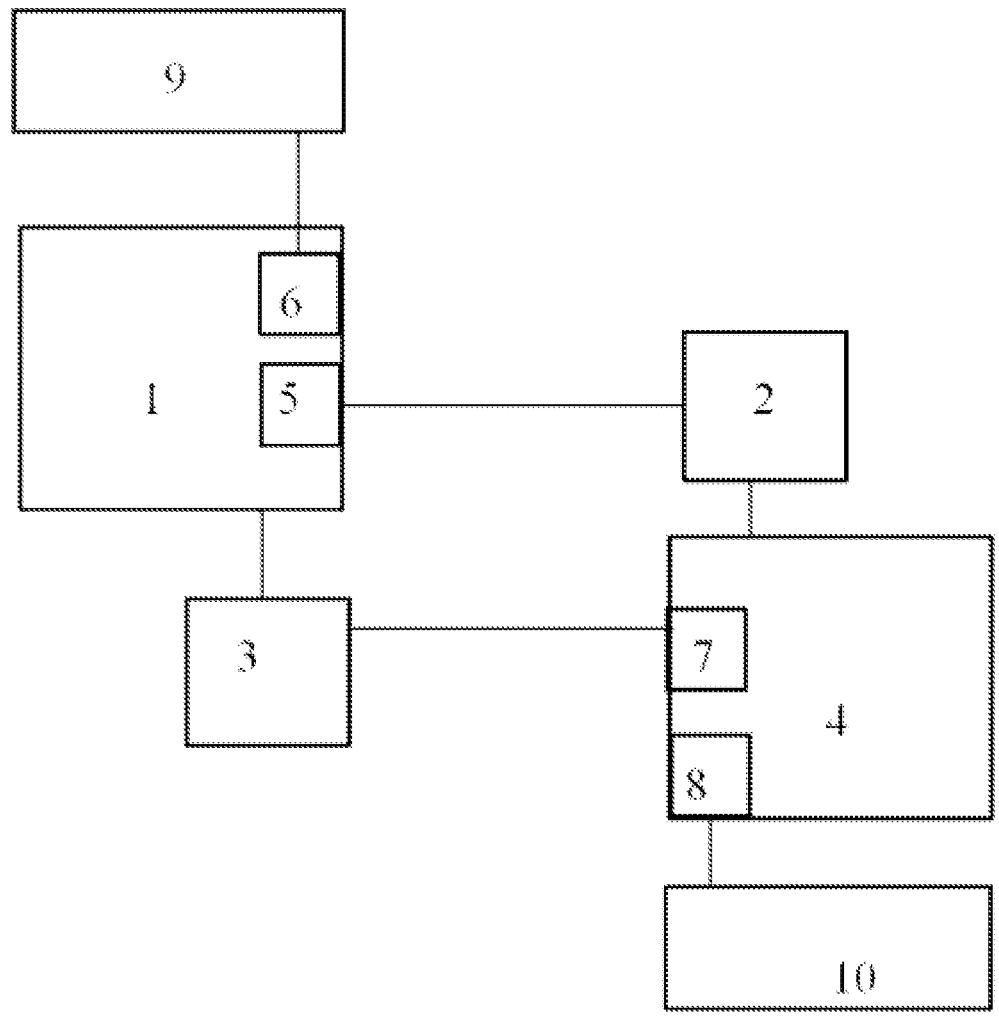
FIG. 2 is a schematic structural diagram of an embodiment of a data transmission apparatus according to the present invention.

In another embodiment of the present invention, as shown in FIG. 2, a data transmission apparatus includes: a first computer 1, a first image capture apparatus 2, and a second computer 3, where the first computer is connected to the first image capture apparatus 2 through an image output port of the first computer, the first image capture apparatus is connected to the second computer 3, the first image capture apparatus has an image input port, the image input port is connected to the image output port of the first computer, and the image output port of the first computer includes an output port of a display card of the first computer.

The first computer 1 further includes a second display card 6, where the second display card 6 is connected to a first display 9, and content in the first computer 1 may be displayed on the first display 9 through the second display card 6. Likewise, the second computer 2 further includes a fourth display card 8, where the fourth display card 8 is connected to a second display card 10, and content in the second computer 2 may be displayed on the second display 10 through the fourth display card 8.

Preferably, the data transmission apparatus further includes a second image capture apparatus 3, where an image output port of the second computer is connected to an input port of the second image capture apparatus 3, the image capture apparatus has an image input port, the image input port is connected to the image output port of the second computer, the second image capture apparatus is connected to the first computer, and the image output port of the second computer includes an output port of the display card of the second computer.

Preferably, the first computer sends first data to the first image capture apparatus through the image output port of the first computer, and the second computer receives the first data from the first image capture apparatus; or the first image capture apparatus processes the first data to generate second data, and the first image capture apparatus sends the second data to the second computer.

Preferably, the second computer sends third data to the second image capture apparatus through a display card of the second computer.

Preferably, the third data is generated by the second computer by processing the first data or the second data.

It should be noted that, all the foregoing embodiments may be combined freely according to a requirement. Described above are merely preferred embodiments of the present invention. It should be noted that a person of ordinary skill in the art may further make improvements and refinements without departing from the principle of the present invention, and these improvements and refinements shall also be considered to fall within the protection scope of the present invention.

What is claimed is:

1. A data transmission method, wherein the method is used to transmit data between a first computer and a second computer, and comprises:
   sending, by the first computer, first data to a first image capture card through an image output port of the first computer;
   receiving, by the first image capture card, the first data; and
   sending, by the first image capture card, the first data to the second computer; or
   processing, by the first image capture card, the first data to generate second data, and sending, by the first image capture card, the second data to the second computer; wherein
   the first image capture card has an image input port, and the image input port is connected to the image output port of the first computer;
   the image output port of the first computer comprises an output port of a display card of the first computer; and
   a program in the second computer identifies a content in the first data or a content in the second data, and if information contained in the content in the first data or the content in the second data successfully matches information required for further execution of the program, the program processes the first data or the second data to generate third data.

2. The data transmission method according to claim 1, wherein before the first data is sent, the method further comprises:
   after the first computer receives a request sent by a browser or an application for accessing or modifying a database, putting, by the first computer, information required for implementing the request in the first data; or
   putting, by the first computer, content of a file in the first computer in the first data; or
   processing, by the first computer, content of a file in the first computer, and then putting the content in the first data; or
   putting, by the first computer, content of a web page in the first data; or
   putting, by the first computer, content externally obtained by the first computer in the first data; or
   putting, by the first computer, information in the first computer in the first data.

3. The data transmission method according to claim 1, further comprising:
   sending, by the second computer, the third data to a second image capture card through an image output port of the second computer; and
   sending, by the second image capture card, the third data to the first computer;
   or
   processing, by the second image capture card, the third data to generate fourth data, and sending, by the second image capture card, the fourth data to the first computer; wherein
   the second image capture card has an image input port, and the image input port is connected to the image output port of the second computer; and the image output port of the second computer comprises an output port of a display card of the second computer.

4. The data transmission method according to claim 1, wherein the program in the second computer accesses or modifies the database during the processing of the first data or the second data.

5. The data transmission method according to claim 1, wherein the first computer puts a file in the first computer in the first data; and after the second computer receives the first data, the second computer restores the first data to the file or the second computer stores the first data in a new file.

6. The data transmission method according to claim 1, wherein the first computer is a web server or an application server.

7. The data transmission method according to claim 1, wherein the second computer is a database server.

8. A data transmission apparatus which performs the data transmission method according to claim 1, comprising the first computer, the first image capture card, and the second computer, wherein the first image capture card is connected to the second computer.

9. The data transmission apparatus according to claim 8, further comprising a second image capture card, wherein an image output port of the second computer is connected to an input port of the second image capture card, the second image capture card has an image input port, the image input port is connected to the image output port of the second computer, the second image capture card is connected to the first computer, and the image output port of the second computer comprises an output port of a display card of the second computer.

10. The data transmission apparatus according to claim 9, wherein the first computer sends first data to the first image capture card through the image output port of the first computer, and the second computer receives the first data from the first image capture card; or the first image capture card processes the first data to generate second data, and the first image capture card sends the second data to the second computer.

11. The data transmission apparatus according to claim 10, wherein the second computer sends third data to the second image capture card through the display card of the second computer.

12. The data transmission apparatus according to claim 11, wherein the third data is generated by the second computer by processing the first data or the second data.

* * * * *